No. 807,059. PATENTED DEC. 12, 1905.
W. CARTER.
SHEET FEEDING MACHINE.
APPLICATION FILED JULY 31, 1903.
8 SHEETS—SHEET 4.
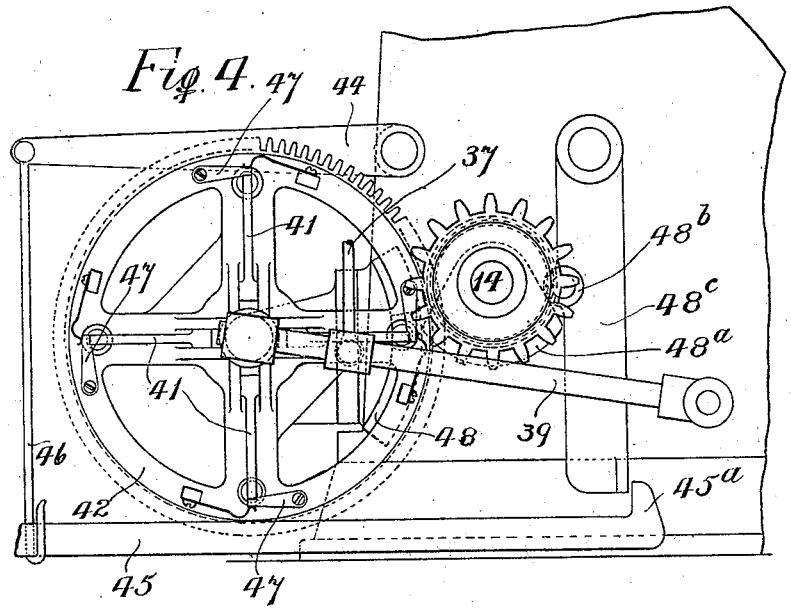
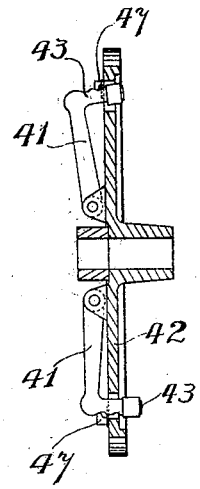
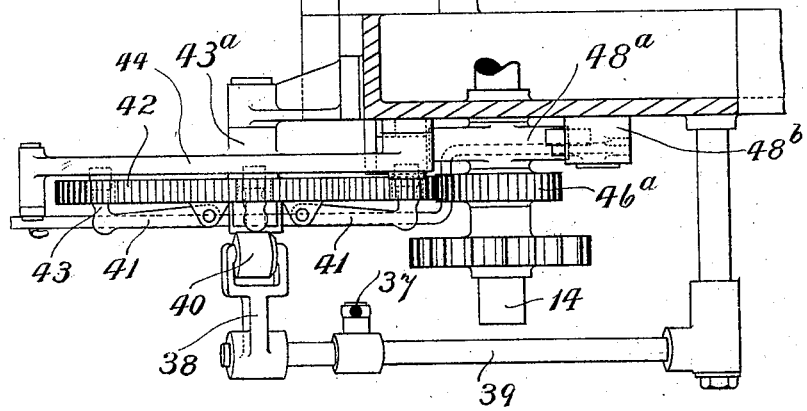
Witnesses.
Inventor
William Carter
by B. Singer
Att'y.

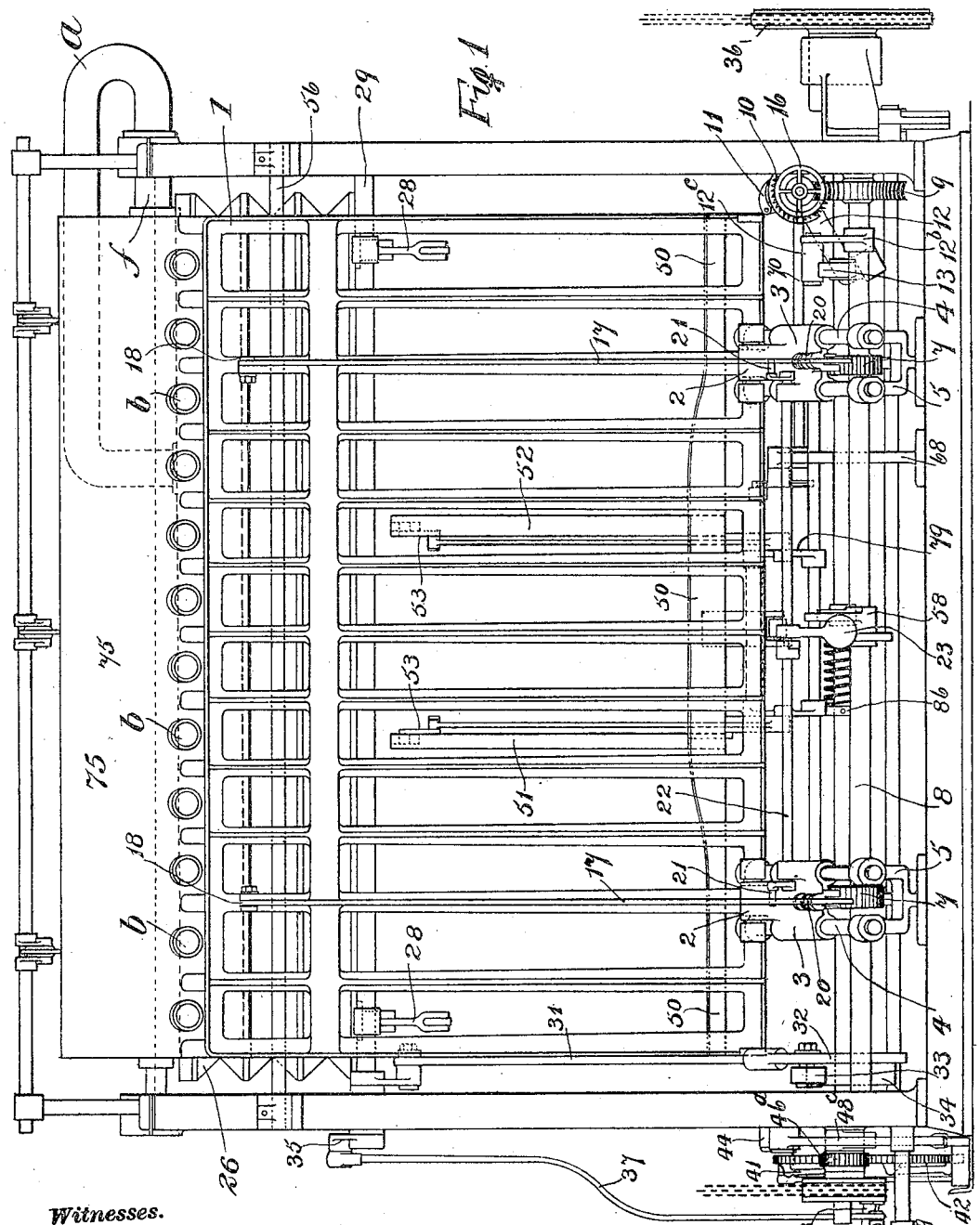

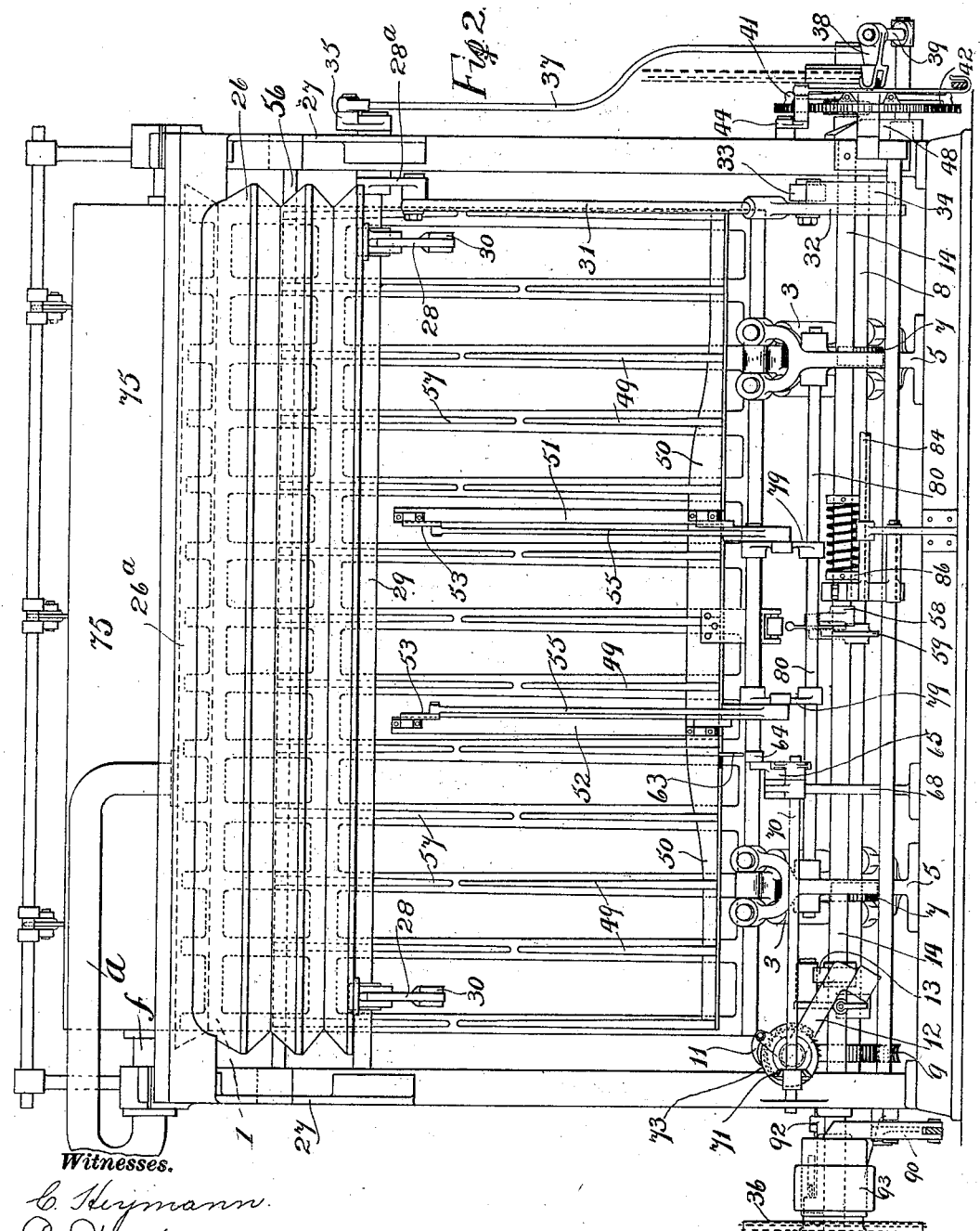

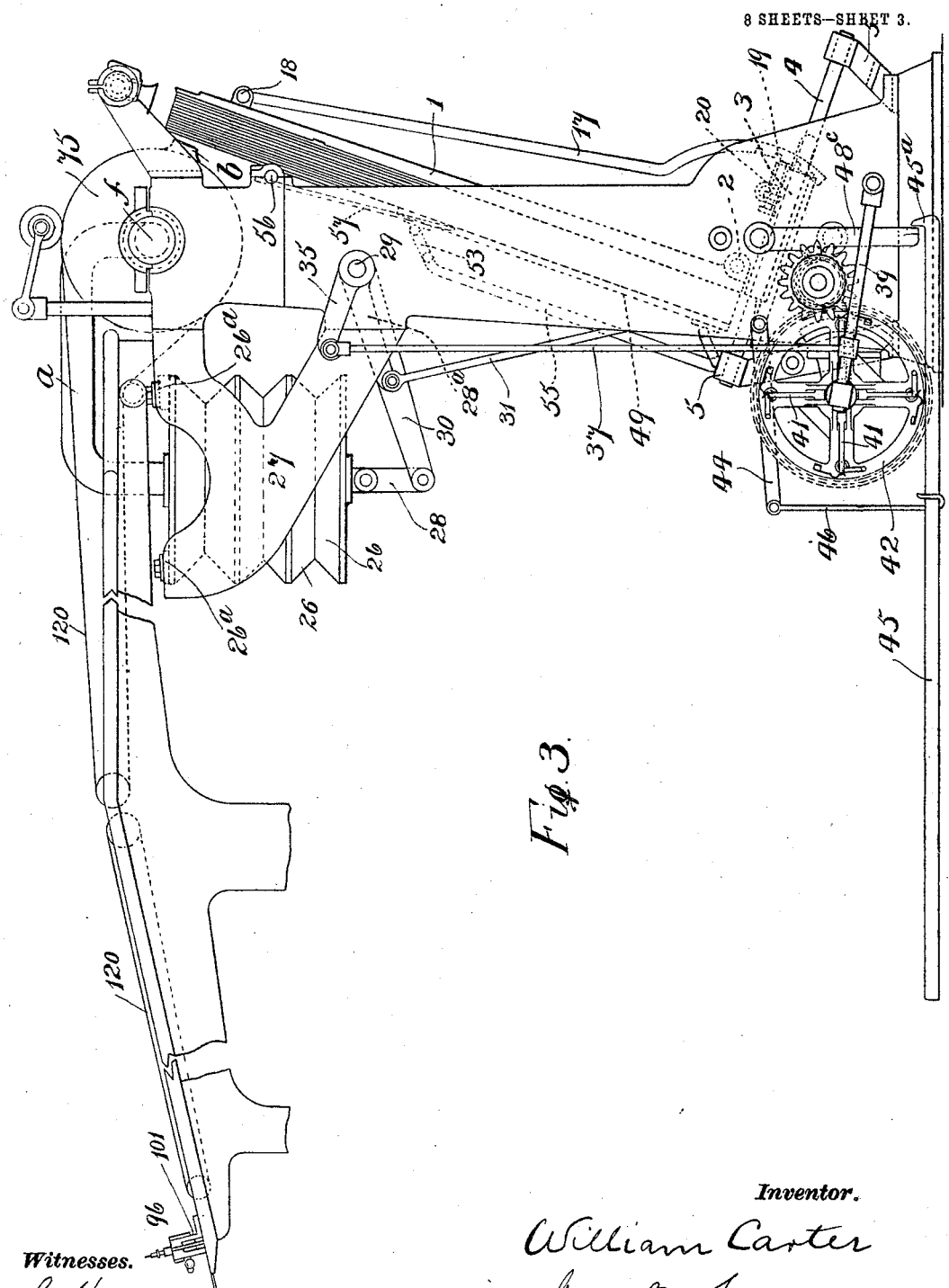

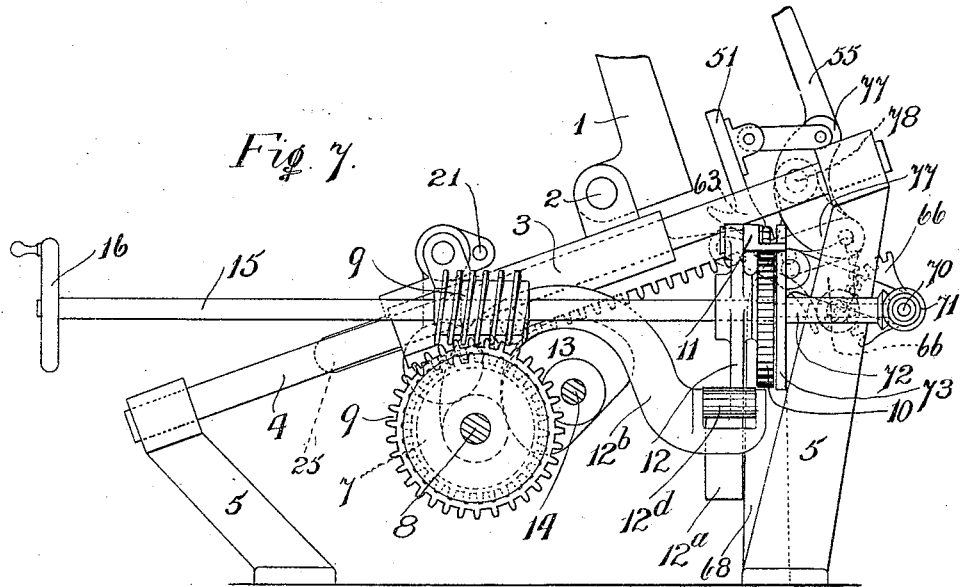
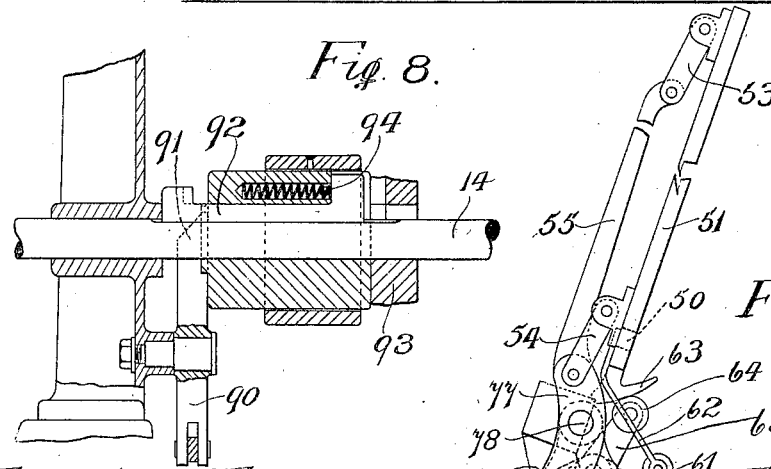
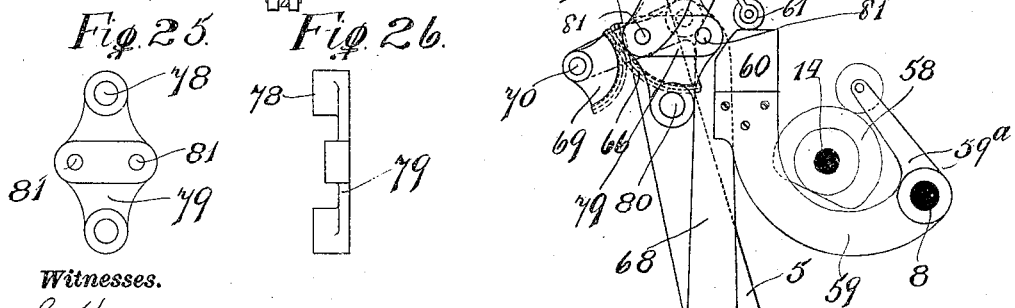

No. 807,059. PATENTED DEC. 12, 1905.
W. CARTER.
SHEET FEEDING MACHINE.
APPLICATION FILED JULY 31, 1903.
8 SHEETS—SHEET 6.
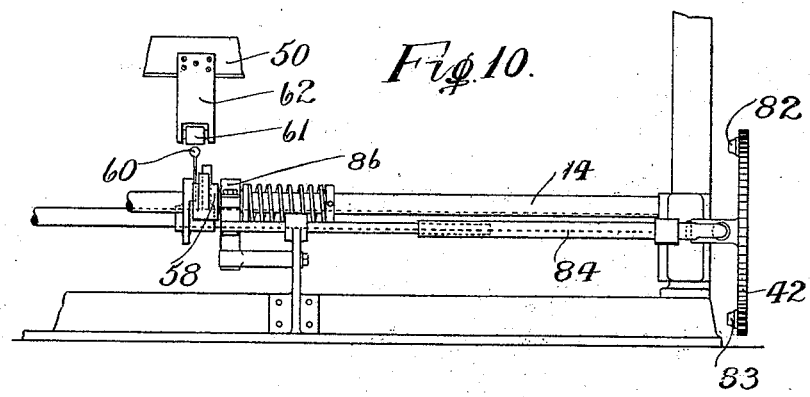
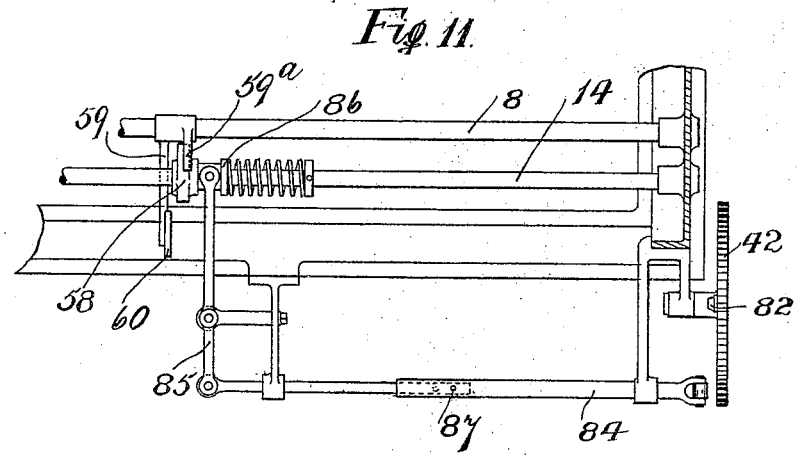
Witnesses.
C. Heymann.
R. Winter.
Inventor.
William Carter
by P. J. Singer
Att'y.

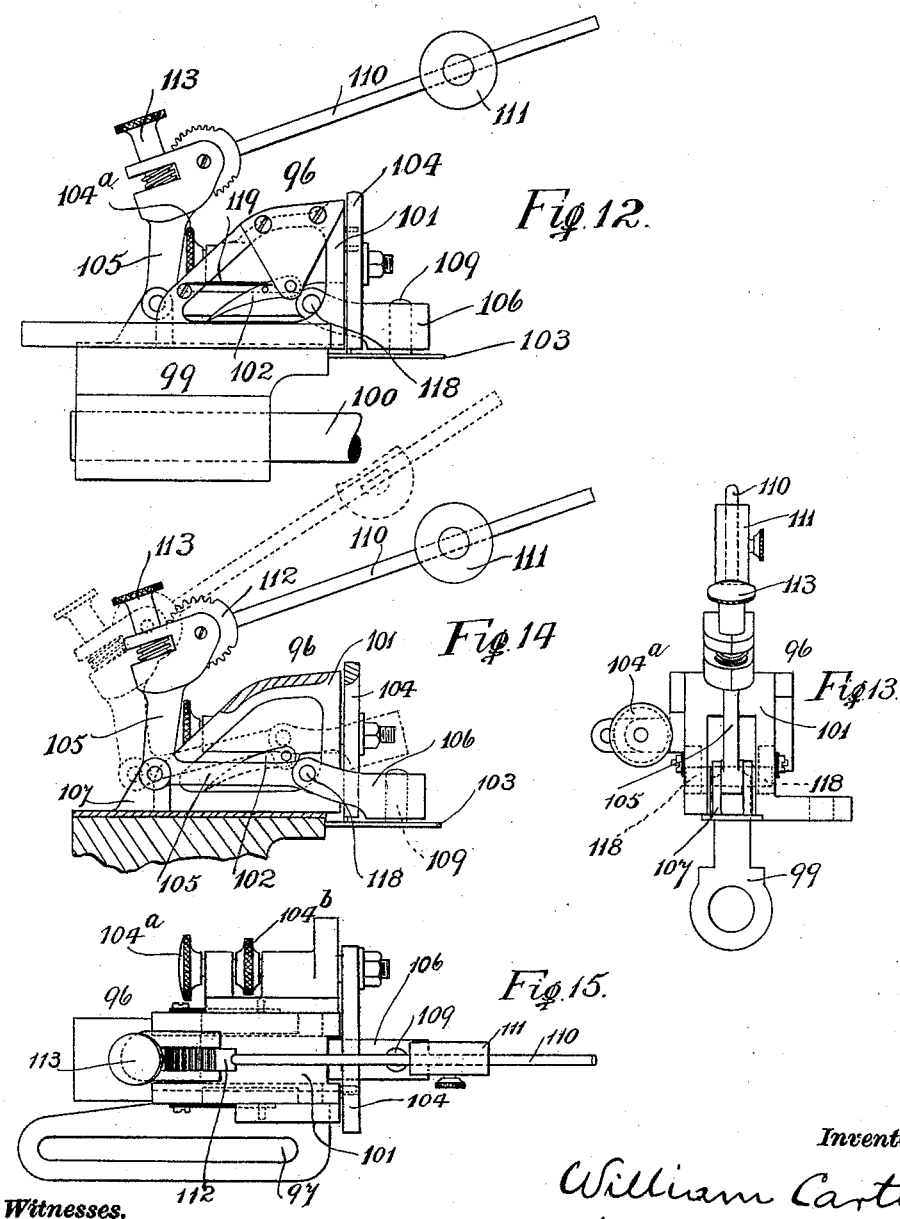

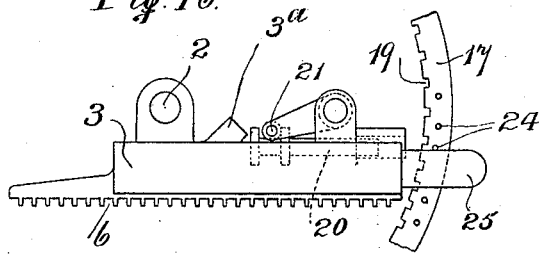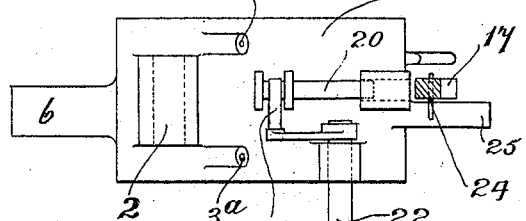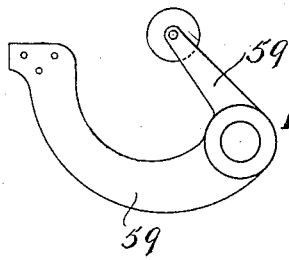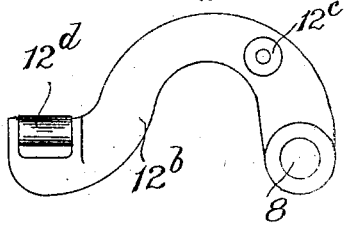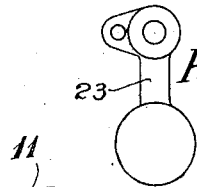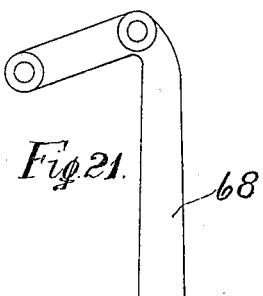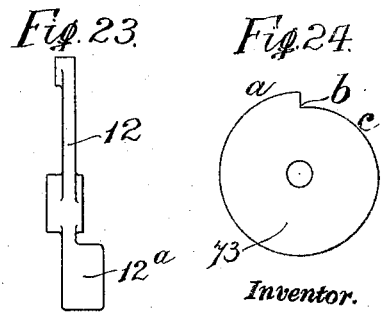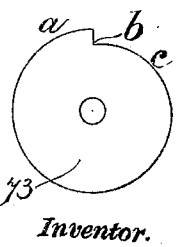

UNITED STATES PATENT OFFICE.

WILLIAM CARTER, OF GLASGOW, SCOTLAND, ASSIGNOR TO THE CARTER AUTOMATIC SHEET FEEDER SYNDICATE LIMITED, OF LONDON, ENGLAND.

SHEET-FEEDING MACHINE.

No. 807,059.  Specification of Letters Patent.  Patented Dec. 12, 1905.

Application filed July 31, 1903. Serial No. 167,702.

*To all whom it may concern:*

Be it known that I, WILLIAM CARTER, lithographic printer, a subject of the King of Great Britain, residing in Glasgow, Scotland, have invented certain new and useful Improvements in Sheet-Feeding Machines, of which the following is a specification.

This invention relates to pneumatic feeding mechanism for automatically feeding sheets of paper to printing, lithographic, and other machines.

The present invention is a development of and an improvement upon my prior inventions, United States Patent No. 631,950, dated August 29, 1899, and United States Patent No. 639,960, dated December 26, 1899.

In order that my said invention may be properly understood, I have hereunto appended explanatory drawings, whereon—

Figure 1 is a front elevation of the automatic feeding-machine. Fig. 2 is a back elevation of the same. Fig. 3 is a side elevation of the machine and also showing part of the feeding-table of a printing-machine. Fig. 4 is a side view, Fig. 5 a plan, and Fig. 6 a section, of the automatic stopping mechanism. Fig. 7 is a side view of the mechanism for feeding forward the sheet-holder. Fig. 8 is sectional view of the feeder-throw-out gear. Fig. 9 is an end view of the parallel-ruler motion of the finger-frame. Fig. 10 is a side view, and Fig. 11 a plan, of the double rolling gear. Fig. 12 is a side view, Fig. 13 an end view, Fig. 14 a section, and Fig. 15 a plan view, of the registering device. Figs. 16 to 26 are detail views.

On the drawings the same reference-characters wherever repeated indicate the same parts.

Under this invention the paper or sheet holder 1, which consists of an open-work frame, is hinged at 2 2 to slides 3 3, which slide on inclined guides 4, carried in the brackets 5 of the machine-frame. (See also Fig. 7.) Each slide, which is shown in detail, side, and plan views at Figs. 16 and 17, has a rack 6 at its under side, and the racks gear with pinions 7 7 on a shaft 8, which is revolved by means of worm-gear 9 9, and the latter is actuated intermittently, so as to give a step-by-step feed-motion to the slides and the sheet-holder by means of ratchet-and-pawl gear 10 11. The pawl 11 is pinned on a cranked rocking lever 12, (see also Figs. 22 and 23,) which is weighted at its end $12^a$ and is operated by a bent lever $12^b$, (see also Fig. 19,) which is freely pivoted on the shaft 8 and is provided with a laterally-projecting roller $12^c$, which is acted on by the cam 13 on the main shaft 14. The lever $12^b$ has a roller $12^d$, which acts on the lever 12. The worm-shaft or feed-shaft 15 is provided with a hand-wheel 16, whereby it can be turned by hand so as to move back the sheet-holder when necessary.

In order that the sheet-holder 1 may be adjusted to and held at different angles to suit the different classes of paper being fed to the printing-machine, it is provided with two back-stays 17, which are hinged to the sheet-holder at their upper ends at 18 and are curved or arced at their lower ends. (See Fig. 3.) These lower ends are provided with series of teeth 19, (see also Figs. 16 and 17,) and locking-pins 20 are provided and adapted to lock into the teeth, and thereby hold the sheet-holder in any adjusted position. The locking-pins may be slidable and be actuated by means of crank-pins 21 on cranks at the ends of a rockable bar 22, which may be turned or rocked by means of a weighted throw-over lever 23 (see also Fig. 20) or a similar arrangement.

In order to hold the sheet-holder in position when it is turned or bent back, so as to put a supply of paper on it, pins 24 are provided, one on each stay, and these pins rest on lugs 25 on the slides 3. The holder is so constructed, as aforesaid, that it can be allowed to fall back, turning on its hinges 2 in order to receive a fresh supply of paper without stopping the machine.

$3^a$ represent oil-holes.

The suction-bellows 26 is arranged at the top of the machine, being secured to cross-plates $26^a$, supported by side brackets 27. The bellows opens or expands by its own weight, and the bottom of it is weighted for this purpose; but it is collapsed by means of links 28, connected to the rock-shaft 29 by means of the crank-arms 30. The rock-shaft is actuated by a crank $28^a$, lever 31, and fork 32, which latter has a roller 33, working on the cam 34 of the main shaft 14, which latter is driven in any suitable manner, such as by chain-gear 36, from a suitable rotating part of the printing-machine. The fork 32 embraces the shaft 14 and is guided thereby. The bellows 26 is connected, by means of a pipe $a$, to the hollow trunnion $f$ of the suction-cylinder 75. This cylinder is provided with a series of suction-nozzles b, which lift the sheets away from the stack which is on the sheet-holder.

Automatic stopping mechanism is provided for stopping the printing-machine whenever a sheet of paper is missed—i. e., not lifted from the sheet-holder 1 and fed forward by the feeder. This stopping mechanism is so arranged that when the bellows 26 fully expands—that is, when the bottom of the bellows falls down, which happens when a sheet is missed—the bellows operates, by means of the arm 35 on the shaft 29 and a rod 37, a knocking-out lever 38 on a rocking arm 39, (see also Figs. 4 to 6,) provided with a roller 40, which works against a series of radial hinged pawls 41, carried by a revolving check-wheel 42, mounted on a stud $43^a$, and knocks out one of these pawls, so that the pin 43 thereof (as the wheel revolves) strikes against an arm 44, and thereby lifts up a check-lever 45 by the hook 46 and causes the catch $45^a$ to engage with the vibrating arm $48^c$, whereby the check-lever 45 is pulled, so as to operate the stopping-gear and stop or check the impression-cylinder of the printing-machine without stopping the latter. The expansion of the bellows takes place owing to the fact that whenever a sheet is missed the suction-nozzles of the suction-cylinder are not covered by the sheet, so that air can rush into the weighted bellows and allow it to fully expand. When a sheet is not missed, the bellows only moves to a very slight extent, sufficient to create suction enough to retain the sheet over the nozzles of the suction-cylinder, and as the sheet covers these nozzles air cannot rush into the bellows, so that the latter cannot fully expand. The check-wheel 42 has circumferential teeth which gear with the pinion $46^a$ on the main shaft 14, and the teeth are arranged so as to give the proper number of revolutions to the check-wheel. The hinged pawls are provided with spring-checks 47 to prevent the pawls 41 being moved too far back. These checks engage with depressions in the pins of the pawls, as shown at Fig. 6. Any pawl "knocked out"—that is, pushed through its hole in the wheel 42 by the roller 40—is automatically replaced by means of a face-cam 48, secured to the side of the machine-framing. As will be seen, the pins 43 of the pawls have friction-rollers at their ends. The stop mechanism also stops the impression-cylinder of the printing-machine when the paper is all used up. This stopping mechanism is specially adapted for use with automatic feeders applied to rotary aluminium-printing presses and to two-revolution and other presses having more than one sheet in motion at a time on the feed-table.

The arm $48^c$ is constantly vibrated by the action of a cam $48^a$ on the shaft 14, and which acts on the roller $48^b$ of the arm. As before stated, the arm $48^c$ pulls the lever 45, and thereby operates the stopping or "trip" gear of the printing-machine, which gear may be of the usual construction.

The sheets of paper on the sheet-holder are borne against by a "feeler" or "finger" frame, which consists of a number of long and short fingers 49, projecting up from a cross bar or board 50, which is arranged at the back of the machine, as shown at Fig. 2, and is provided with two uprights 51 52, connected, by means of links 53 54, (see also Fig. 9,) to supports 55 in such manner as to have a parallel-ruler motion. This finger-frame bears on the paper sheets by gravity and is moved away therefrom at the proper times—that is, each time a sheet is about to be withdrawn from the sheet-holder by the action of cam-and-lever mechanism, as hereinafter described.

Secured to the cross-bar 56 is a fixed finger-frame having a number of long and short fingers 57, which are arranged to correspond with the long and short fingers 49 of the frame 50.

The mechanism for operating the movable finger-frame consists of a cam 58 on the shaft 14, which acts on the tail part $59^a$ of the bent lever 59, fulcrumed on the shaft 8. (This lever is shown in detail view at Fig. 18.) The lever has a plate 60 at its end, which acts on a roller 61, connected rigidly by a fork 62 to the finger-frame 50.

As before stated, the uprights of the frame 50 are connected by links 53 54 to the supports 55, and also, as hereinbefore stated, the finger-frame bears or rests upon the pile of paper sheets on the sheet-holder by the action of gravity. It is necessary that just before a sheet of paper is withdrawn from the pile on the sheet-holder by the action of the suction-cylinder 75 the finger-frame should be moved back off the paper sheets so as to momentarily release them, and this is done by the action of the cam 58, which moves the lever 59, so as to push up the frame 50, and thereby, owing to the action of the links 53 54, give a slight backward parallel-ruler motion to the finger-frame. The cam 58 is so made that immediately the top sheet of the pile is withdrawn the finger-frame can fall down again and press on the sheets. This movement of the finger-frame is utilized to automatically regulate the forward step-by-step feed movement of the sheet-holder. It is done in this manner: The finger-frame has at its lower end a curved toe-plate 63, (see Fig. 9,) which bears on a roller 64 on the arm 65 of a toothed quadrant 66, which is pivoted on a stud 67, projecting from the pillar 68. (See Figs. 2, 7, 9, and 21.) The quadrant 66 engages with the quadrant 69, keyed to a shaft 70, which gears, by means of bevel-gear 71, with a sleeve 72 on the end of the shaft 15. Carried at the end of the sleeve is a cam disk or guard 73, which is shown in detail view at Fig. 24. A laterally-projecting finger 74 on the pawl 11 rests on the periphery of this guard 73, and the movement of the guard regulates the number of teeth of the ratchet-wheel 10 skipped by the pawl at each movement of the latter. This will be understood when it is pointed out that so long as the finger 74 of the pawl rests on the high part a of the guard (see Fig. 24) the pawl is lifted up out of engagement with the teeth of the ratchet-wheel, but when the finger falls down the step b onto the low part c of the guard the pawl engages with the ratchet-wheel, and consequently pushes round the latter. Now of course as the arc through which the pawl moves is constant it follows that if it is held up off the ratchet-wheel for a long period it will take only a few teeth before it completes its movement, and consequently will only give a slight turn to the ratchet-wheel and feed-shaft, whereas if it is only held up for a short period it will take a greater number of teeth and give a greater movement to the ratchet-wheel and feed-shaft, while if it is not held up off the ratchet-wheel it will take its maximum number of teeth and give the maximum movement to the ratchet-wheel and feed-shaft. The number of teeth of the ratchet-wheel taken by the pawl at each reciprocation regulates the movement of the feed-shaft 15, and therefore controls the feed-motion of the sheet-holder. The guard is brought back to its original position after each movement by the action of the weight of the quadrant 66. It will be seen from Fig. 9 that the broad or toothed end of the quadrant 66 is heavier than the narrow arm 65, carrying the roller 64. The toothed part is made sufficiently heavy to turn the quadrant 69 and shaft 70 and bring the quadrant back again to its original position. This feed-regulating mechanism is very important, as it insures that the forward feed of the sheet-holder shall be in exact proportion to the diminution in thickness of the pile of paper on the holder. A thin paper only requires a slight forward feed, whereas a thick paper requires a much more pronounced forward feed. My mechanism automatically provides for these variations.

Whenever all the sheets are fed from the sheet-holder, the guard is moved so as to raise the pawl out of contact with the ratchet, so that further feeding is automatically stopped.

The sheet-holder can be moved back at any time by turning the feed-shaft 15 by the hand-wheel 16.

In order that the finger-frame may be adjusted to the same angle as the sheet-holder, the supports 55 are, as shown at Fig. 9, made with curved tailpieces 77, which are pivoted at 78 to a pivot-plate 79, (see also Figs. 25 and 26,) pivoted at its lower end on the shaft 80. Each tailpiece has a hole at its end, and holes are made in the pivot-plate, so that when the finger-frame is moved it can be locked in the adjusted position by inserting a pin into the proper holes. Two locking-holes 81 are shown in the plate, Fig. 25.

There is or may be provided special gear adapted for use when double rolling or inking is to be performed by the printing-machine. When this is to be done, it is necessary that the feeder should only feed one sheet for every two revolutions of the suction-feed cylinder, thereby alternately feeding a sheet to the printing-machine and missing a sheet and simultaneously alternately checking or tripping the impression-cylinder of the printing-machine. This special gear consists of cams or inclined faces 82 83 on the check-wheel 42, as shown at Figs. 10 and 11. These cams are so arranged that whenever a sheet is to be missed one of them acts on a rod 84 and pushes said rod so as to operate a lever 85 and move a spring-clutch 86, which throws the cam 58 for lifting the finger-frame out of gear, with the result that the finger-frame under the action of gravity presses against the sheets of paper on the holder and prevents them being fed.

When it is desired to unship the double rolling-gear, a coupling-pin 87 on the rod 84, actuated by the check-wheel, is disengaged, and then the end of the rod (which is made in two parts telescopically fitted together) is pulled in, so as to be away from the check-wheel and is locked in this position by the pin.

In order to stop the feeder from feeding sheets without stopping the printing-press, I provide a rockable throw-out lever 90, (see Fig. 8,) which can be rocked by means of a suitable hand-lever and which is provided with a wedge point 91, that engages with the wedge-shaped end of a clutch-pin 92 and withdraws it from the chain-wheel hub 93. When the lever 90 is disengaged, the clutch-pin 92, which is actuated by a spring 94, moves back again into the notch of the driving-chain-wheel hub 93 and puts the machine in motion again by keying the chain-wheel to the driving-shaft 14.

Gages for registering the sheets are also provided in connection with the machine. These gages are fitted to the feed-table (see Fig. 3) and consist of two parts—one a fixed part 96, secured by a slot 97 and screw-adjustment to the feed-table, and the other a movable part 99, connected to a reciprocating rod or bar 100, which is operated from the feed mechanism or the printing-machine in any suitable manner. (Not shown.) The fixed part has an open housing 101 and two cam-levers 102 therein and also a fixed projecting tongue 103 and an adjustable registering-gage 104. The part 99 has a bracket 107, to which is fulcrumed a bell-crank lever 105, provided with a finger 106 at its end. In the finger is a wood or rubber pin 109 for pulling the sheet of paper. The bell-crank has pivoted in it an arm 110, provided with an adjustable weight 111 and a toothed disk 112, whose teeth engage with a worm-screw 113, so that by turning the screw the angle of the rod 110 and weight 111 can be altered so as to give a greater or less leverage. The gage 104 can be accurately set by means of the screw 104$^a$ and nut 104$^b$. The rod 100 is arranged to move synchronously with the action of the feeder, and when the rod is moved in one direction it brings the finger 106 forward to the position shown at Fig. 12, so as to rest on the sheet of paper being fed forward to the printing-cylinder by the usual feeding-tapes 120, (see Fig. 3,) and then the rod 100 moves backward, so as to pull the sheet to the exact register against the gage 104. The finger travels back until its laterally-projecting pins 118 move below and clear of the cam-levers 102, which are depressed by springs 119, Fig. 12. At the proper time the rod 100 moves forward again, with the result that the pins 118 move along the upper sides of the cam-levers and tilt the bell-crank and raise up the finger 106, as shown in dotted lines at Fig. 14, ready to fall down immediately the pins 118 clear the ends of the cam-levers, onto the next sheet of paper, and at the backward movement of the rod 100 to pull this sheet to the exact register. It will be seen that the pressure (due to the weight 111) of the finger on the sheet of paper can be nicely adjusted by means of the screw 113.

Having now fully described my invention, what I claim, and desire to secure by Letters Patent, is—

1. In a pneumatic feeder, the combination with an inclined sheet-holder consisting of an inclined frame carried by slides working on guides, of racks on the slides, pinions engaging with the racks, means for driving said pinions and feeding the slides forward intermittently, a frame which rests by gravity against the pile of sheets of paper on the holder and means for moving said frame away at certain times from the sheets.

2. In a pneumatic feeder, the combination with an inclined sheet-holder consisting of an inclined frame carried by slides working on guides, of racks on the slides, pinions engaging with the racks, a shaft carrying the pinions, worm-gear for driving the shaft, ratchet-and-pawl gear for driving the worm-gear means for automatically regulating the number of teeth skipped by the pawl at each feed movement and means for operating the ratchet-and-pawl gear.

3. In a pneumatic feeder, the combination with a sheet-holder consisting of a frame carried by slides working on guides, of racks on the slides, pinions engaging with the racks, a shaft carrying the pinions, worm-gear for driving the shaft, ratchet-and-pawl gear for driving the worm-gear, a worm-wheel on said shaft, a worm on a worm-shaft for driving the worm-wheel, a ratchet-wheel on the worm-shaft, a weighted pawl pivotally secured on the worm-shaft, a pawl-operating lever, and a cam operated by the machine for operating the lever, substantially as described.

4. In a pneumatic feeder, the combination with an inclined sheet-holder consisting of an inclined frame carried by slides working on guides, of racks on the slides, pinions engaging with the racks, a shaft carrying the pinions, worm-gear for driving the shaft, ratchet-and-pawl gear for driving the worm-gear, a finger on the pawl, a cam for acting on the finger and raising the pawl up out of engagement with the ratchet and means for moving said cam, substantially as described.

5. In a pneumatic feeder, the combination with a sheet-holder consisting of a frame carried by slides working on guides, of racks on the slides, pinions engaging with the racks, a shaft carrying the pinions, worm-gear for driving the shaft, ratchet-and-pawl gear for driving the worm-gear, a finger on the pawl, a cam for acting on the finger and raising the pawl up out of engagement with the ratchet, quadrant and bevel gears for moving the cam and means for operating the quadrant and bevel gears, substantially as described.

6. In a pneumatic feeder, the combination with a sheet-holder consisting of a frame carried by slides working on guides, of racks on the slides, pinions engaging with the racks, a shaft carrying the pinions, worm-gear for driving the shaft, ratchet-and-pawl gear for driving the worm-gear, a finger on the pawl, a cam for acting on the finger and raising the pawl up out of engagement with the ratchet, quadrant and bevel gears for moving the cam, a movable frame resting on the sheets of paper on the sheet-holder, means for moving this frame, and a toe-piece on the frame for operating the quadrant-gear, substantially as described.

7. In a pneumatic feeder, the combination with a sheet-holder consisting of a frame carried by slides working on guides, of racks on the slides, pinions engaging with the racks, a shaft carrying the pinions, worm-gear for driving the shaft, ratchet-and-pawl gear for driving the worm-gear, a finger on the pawl, a cam for acting on the finger and raising the pawl up out of engagement with the ratchet, bevel-gear for moving the cam, quadrant-gear for operating the bevel-gear, a movable frame arranged in connection with the sheet-holder and which is adapted to operate the quadrant-gear and means for moving the said frame, substantially as described.

8. In a pneumatic feeder, the combination with the sheet-holder of the machine of a frame which rests by gravity against the pile of sheets of paper on the holder, links connected to the frame, supports to which the links are attached, and means for moving the frame away from the paper sheets with a parallel-ruler movement.

9. In a pneumatic feeder, the combination with the sheet-holder of the machine of a frame which rests by gravity against the pile of sheets of paper on the holder, links connected to the frame, supports to which the links are attached, a fork connected with the frame, a roller thereon, a lever adapted to push up said roller and a cam for operating the lever, substantially as described.

10. In a pneumatic feeder, the combination of a sheet-holder carried by slides, of means for feeding forward the slides, backstays hinged to the holder, teeth at the lower ends of the stays, pins connected with the slides for engaging said teeth, and means for moving the pins, substantially as described.

11. In a pneumatic feeder, the combination with the sheet-holder, the suction-cylinder and the means for producing the suction, of a shaft, a check-wheel means for operating the check-wheel from said shaft, and gear connected with the check-wheel for stopping the machine to which the sheets are being fed.

12. In a pneumatic feeder, the combination with the sheet-holder, the suction-cylinder and the means for producing the suction, of a shaft, a check-wheel means for operating the check-wheel, hinged pawls on the check-wheel, means for knocking out said pawls, means for forcing them in again, and gear connected with the check-wheel for stopping the machine to which the sheets are being fed.

13. In a pneumatic feeder, the combination with the sheet-holder, the suction-cylinder, and the means for producing the suction, of mechanism for automatically stopping the machine to which the sheets of paper are being fed whenever a sheet of paper is missed by the feeder, and mechanism for controlling the feeder so that one sheet only can be fed for every two revolutions of the suction-cylinder.

14. In a pneumatic feeder the combination with the sheet-holder of the machine of a frame which rests by gravity against the pile of sheets of paper on the holder, a revoluble suction-cylinder, means for producing the suction, means for moving said frame away from the sheets on the holder and means for controlling said moving means so that one sheet only shall be fed for every two revolutions of the suction-cylinder, substantially as described.

15. In a pneumatic feeder, the combination with the sheet-holder of the machine of a frame which rests by gravity against the pile of sheets of paper on the holder, links connected to the frame, supports to which the links are attached, a fork connected with the frame, a roller thereon, a lever adapted to push up said roller, a cam for operating the lever, a clutch connected with said cam and means for throwing said clutch out of gear, substantially as described.

Signed at Glasgow, Scotland, this 15th day of July, 1903.

WILLIAM CARTER.

Witnesses:
  HENRY LAING,
  JOHN W. McCOLL.